United States Patent [19]

Jakobsen et al.

[11] 4,374,166
[45] Feb. 15, 1983

[54] AMORPHOUS, DRAWN, CUP-LIKE THERMOPLASTIC PET ELEMENT OF 10–25% CRYSTALLINITY AND MONOAXIAL ORIENTATION IN SIDE WALL

[75] Inventors: Kjell M. Jakobsen, Skanör; Claes T. Nilsson, Löddeköpinge, both of Sweden

[73] Assignee: PLM Aktiebolag, Malmo, Sweden

[21] Appl. No.: 154,889

[22] Filed: May 30, 1980

[30] Foreign Application Priority Data

Jun. 11, 1979 [SE] Sweden ............................. 7905042

[51] Int. Cl.³ ............................................. B65D 00/00
[52] U.S. Cl. .................................. 428/35; 206/524.6; 215/DIG. 7; 264/239; 428/910
[58] Field of Search ................ 428/35, 910; 264/239

[56] References Cited

U.S. PATENT DOCUMENTS

| | | | |
|---|---|---|---|
| 3,496,143 | 2/1970 | Siggel et al. | 260/75 |
| 3,570,064 | 30/1971 | Groot | 425/347 |

FOREIGN PATENT DOCUMENTS

| | | |
|---|---|---|
| 1166455 | 3/1964 | Fed. Rep. of Germany . |
| 1814312 | 6/1969 | Fed. Rep. of Germany . |
| 1965238 | 9/1970 | Fed. Rep. of Germany. |
| 1019854 | 2/1966 | United Kingdom. |
| 1050358 | 12/1966 | United Kingdom . |
| 1159622 | 7/1969 | United Kingdom. |
| 1172193 | 11/1969 | United Kingdom . |
| 1230282 | 4/1971 | United Kingdom . |
| 1236432 | 6/1971 | United Kingdom . |

OTHER PUBLICATIONS

Stille, Introduction to Polymer Chemistry, J. Wiley & Son, NY, pp. 25–27.

*Primary Examiner*—John D. Welsh
*Attorney, Agent, or Firm*—Hane, Roberts, Spiecens & Cohen

[57] ABSTRACT

The invention relates to an element of a thermoplastic of the polyester or polyamide type, and preferably of polyethylene terephthalate, the element consisting of an edge part which surrounds a body in an arrangement in which the latter is sunk relative to the edge part. The element is formed from a blank of mainly amorphous material or from a material having a crystallinity of less than 10%, the blank being, for example, a flat plate, a blank shell or the like. The body or parts thereof are shaped by stretching the blank until that material which is located within the material sections of the blank flows to from the edge part in the element, the material stretched to flowing in the body assuming a crystallinity of between 10 and 25%, while the crystallinity in the material in the edge part and in the unstretched parts retaining its original value of less than 10%. There is also disclosed a process and equipment for manufacturing the element.

16 Claims, 10 Drawing Figures

AMORPHOUS, DRAWN, CUP-LIKE THERMOPLASTIC PET ELEMENT OF 10-25% CRYSTALLINITY AND MONOAXIAL ORIENTATION IN SIDE WALL

BACKGROUND OF THE INVENTION (a) Field of the Invention

The invention relates to an element of a thermoplastic of the polyester or polyamide type, preferably of polyethylene terephthalate, the element consisting of an edge part which surrounds a body in an arrangement in which the latter is sunk relative to the edge part. The element is formed from a blank of mainly amorphous material or from a material having a crystallinity of less than 10%, the blank being for example, a flat plate, a blank shell or the like.

(b) Prior Art

In the manufacture of products from thermoplastics, the starting material is in most cases a virtually flat blank. Either an end product is formed here substantially in one deformation step, or a premoulding is formed for later reshaping to give the end product. The shaping of the blank is effected, according to methods known at present, either by the blow-moulding process or by the thermo-forming process. In the blow-moulding process, thick sections are as a rule obtained in the bottom. In the thermoforming process, either so-called negative thermoforming or socalled positive thermoforming is used. In the negative thermoforming process, a thin bottom is obtained, whilst a thick bottom is obtained in the positive thermoforming process.

In negative thermoforming, a warm sheet or a warm film is placed over cavities, after which the material of the film or the sheet is pressed and sucked into the cavities by external pressure and internal reduced pressure. This has the result that the material is stretched and becomes thin, when it is sucked into the particular cavities. If the cavity is a cup, a thin stretched bottom and a wall thickness increasing in the direction of the edge of the cup are obtained.

In positive thermoforming the cup mould forms a projecting body and the material of the film or sheet is pressed and sucked over this projecting body. This has the result that the material on the upper part of the projecting body, that is to say the bottom of the cup, remains thick and essentially unstretched, whilst the thickness of the material decreases towards the edge of the cup.

To obtain an adequate material thickness in the bottom part of the cup in negative thermoforming, a sufficient thickness in the starting material must be chosen. To obtain an adequate thickness in the edge zone of the cup by positive thermoforming, which is necessary for stability of the cup, a sufficient thickness of starting material must likewise be chosen. In negative thermoforming, the material zones between the shaped cups remain uninfluenced and are subsequently severed, after the manufacture of the actual cups. In positive thermoforming, the material between the cups is drawn into recesses and severed from the cups formed. In positive thermoforming, cup bottoms are thus obtained which have substantially the same thickness as the starting material. Both forming processes require an unnecessarily high consumption of material, which is of economic importance in the mass production of articles.

SUMMARY OF THE INVENTION

The present invention provides a cup which eliminates certain disadvantages connected with the technology hitherto known.

The invention is suitable preferably for the manufacture of elements from thermoplastics of the polyester or polyamide type. Examples of such materials are polyethylene terephthalate, polyhexamethyleneadipamide, polycaprolactam, polyhexamethylene-sebacamide, polyethylene 2,6- and 1,5-naphthalate, polytetramethylene 1,2-dihydroxybenzoate and copolymers of ethylene terephthalate, ethylene isophthalate and similar polymers. The description of the invention below relates mainly to polyethylene terephthalate, called PET hereafter, but the invention is not restricted exclusively to the use of either this material or other materials already mentioned; instead, it is also suitable for many other thermoplastics.

For a better understanding of the existing problem and of the invention, several characteristic properties of the polyester polyethylene terephthalate are described below. From the literature, for example, Properties of Polymers, by D. W. van Krevelen, Elsevier Scientific Publishing Company, 1976, it is known that the properties of the material change when amorphous polyethylene terephthalate is oriented. Some of these changes are shown in the diagrams, FIGS. 14.3 and 14.4 on pages 317 and 319 in the above-cited book. The symbols used in the discussion below correspond to the symbols therein.

PET, like many other thermoplastics, can be oriented by stretching the material. Normally this stretching takes place at a temperature above the glass transition temperature Tg of the material. The strength properties of the material are improved by orienting. The literature shows that, in the case of the thermoplastic PET, an increase in the stretching ratio $\Lambda$, that is to say the ratio of the length of the stretched material and the length of the unstretched material, also leads to an increase in the improvement of the material properties. When the stretching ratio $\Lambda$ is increased from about 2 to a little more than 3, particularly large changes in the material properties are obtained. The strength in the direction of orientation is here markedly improved, whilst at the same time the density $\rho$ and likewise the crystallinity Xc rise and the glass transition temperature Tg is raised. It can be seen from the diagram on page 317 of the above-cited book that, after stretching, with $\Lambda$ assuming the value of 3.1, the material withstands a force per unit area, which corresponds to $\delta = 10$, coupled with a very small elongation, whilst the elongation at $\Lambda = 2.8$ is substantially larger. Hereafter, the term "step" is sometimes used to designate orienting which is obtained by stretching, or a reduction in thickness by at least 3 times, and which leads to the marked improvements of the material properties, indicated above.

The diagrams referred to above show changes which are obtained on a mono-axial orientation of the material. In a biaxial orientation, similar effects are obtained in both directions of orientation. Orientation is carried out as a rule by successive stretchings.

Improved material properties, corresponding to those which are obtained by the "step" defined above, are also obtained if an amorphous material is stretched until it flows and, before flowing, the material is at a temperature which is below the glass transition temperature Tg. In a rod being drawn, a reduction of the diameter of about three times results in the flow zone. On drawing, the flow zone is continuously displaced into the amorphous material, whilst at the same time the material, which has already undergone the state of flowing, absorbs the tensile forces of the test rod without an additional permanent stretching.

The present invention relates to an element suitable for many applications, for example cups similar to those described so far. A further application is reshaping of the elements, where these represent pre-mouldings, to give containers or other parts. For this purpose, for example, a blow process or mechanical working, for example pressing or extending, is used.

According to the invention, an element is obtained which consists of an edge part and a cup part, the material preferably being of more or less uniform thickness and orientation in the entire bottom of the cup part (cup). In a certain embodiment of the invention, the material in the bottom part of the cup moreover consists completely or partially of material of the same thickness as that of the material of the wall. The remaining sections of material have the thickness and material properties of the starting material. In certain applications, the bottom is more or less completely flat, whilst in other applications the bottom consists of parts which are axially displaced relative to the axis of the cup. In this case, in certain embodiments, annular edge sections are formed adjoining the lower edge of the wall, whilst in other embodiments central bottom sections are displaced further away from the upper opening edge of the element.

The element consists of an edge part surrounding a body which is sunk relative to the edge part. The material in the edge part is mainly amorphous or has a crystallinity of less than 10%. The body has a wall part and a bottom part. The wall part is of material which has been drawn at a temperature below the glass transition temperature Tg, until flow sets in, and in which the crystallinity is between 10 and 25%. In the basic design of the element, the bottom is of mainly amorphous material or of material having a crystallinity of less than 10%. In embodiments of the invention, the bottom is, as desired, of material which has been drawn at a temperature below the glass transition temperature Tg and at a crystallinity between 10 and 25%, until flow sets in, that is to say of a material having properties which mainly are identical to the material properties of the wall part of the element, or of material sections which have been drawn until flow sets in and which alternate with material sections of mainly amorphous material or material having a crystallinity of less than 10%. In certain embodiments, the material zones in the bottom, already mentioned, are displaced in the axial direction relative to the lower edge of the wall part.

During the production of an element, a mainly flat blank of thermoplastic, having a crystallinity of less than 10%, is clamped in at a temperature below the glass transition temperature Tg between counter-holders, so that a zone is formed which is completely surrounded by the clamped-in material sections. A press tool, the contact surface of which is smaller than the surface area of the zone, is applied against this zone. Thus, a closed strip-like material zone is formed between the clamped-in material sections of the blank and that part of the zone which is in contact with the press device. Subsequently, a drive mechanism shifts the press device relative to the counter-holder, while the press device remains in contact with the zone. The material in the strip-like zone is thus stretched in such a way that flow of the material occurs, the material being monoaxially oriented, whilst at the same time the thickness of the material is reduced by about 3 times in the case of PET. The wall part of the element is formed during the stretching process.

Since the circumference of the contact surface of the press device is smaller than the inner circumference of the clamping devices, the material which adjoins the edge of the press tool is subjected to the greatest stress, for which reason the flow of the material normally starts at this point. The effect thus resulting is further reinforced by the fact that the transition from the contact surface of the press tool to the side walls of the press device is made relatively sharp-edged. When flow has set in, the zone of flow of the material is gradually shifted in the direction of the clamping devices. In certain application examples, the press step is interrupted when the flow zone has reached the press tools. In other application examples, the press step continues, renewed flowing of the material taking place adjoining the edges of the press tool and being displaced from these zones towards the center of the material. When all the material which is in contact with the contact surface of the press tool has undergone flow, that material between the clamping devices which is located next to the inner circumference of the clamping devices is utilized for a further drawing step in certain application examples. To make this possible, a somewhat elevated temperature in this material is normally required. The starting temperature, however, is still below the glass transition temperature Tg.

In some application examples, accelerated cooling of the drawn material is necessary. In this case, the press tool is preferably provided with a cooling device which is arranged in such a way that the zones of the material, which flow during drawing of the material, are in contact with the cooling device.

In certain applications, the flow of the material is caused to start adjoining the clamping devices. This is accomplished by providing the clamping devices with heating devices which raise the temperature of those material sections where flow is to start. The temperature in the material, however, is still below the glass transition temperature Tg of the material. When the state of flow has been established, this continues in the direction of the contact surface of the press device and, in some cases which may occur, it continues past the transition from the side walls to the contact surface of the press tool.

To ensure that the clamping devices retain the blank in the future edge sections of the element, the clamping devices are as a rule provided with cooling devices.

The concept of the invention also contemplates the possibility that, by a number of sequential drawing steps, both in the wall part and in the bottom part of the body, material sections are obtained which alternately consist of material sectionswhich have been drawn until flow sets in and have in this way been given a reduced wall thickness, and undrawn material sections which have retained their wall thickness. In material sections located in the bottom part of the body, a displacement of the material in the axial direction of the body also takes place in certain application examples in conjunction with the drawing step.

BRIEF DESCRIPTION OF THE DRAWING

The invention will be described in more detail with reference to a number of illustrations in which.

DETAILED DESCRIPTION

Figure 1:
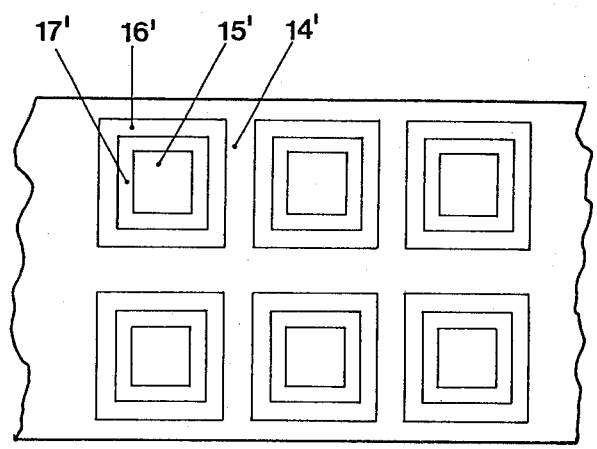
FIGS. 1 and 2 show optional embodiments of bands suitable for reshaping.
Figure 2:
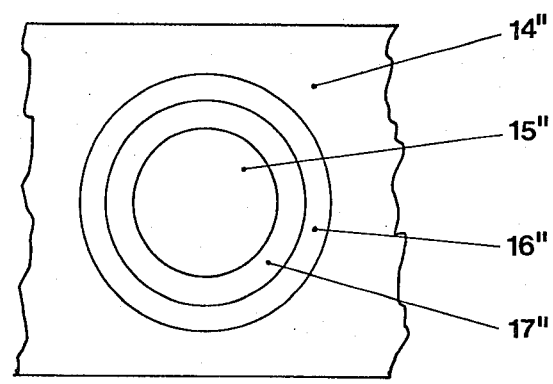

FIGS. 1 and 2 show a band or a blank 14', 14" of thermoplastic material, the bands or blanks being seen from above. In the figures, annular material zones 16', 16", or 17', 17"are represented. Moreover, a material zone 15', 15" is indicated which is surrounded by the original annular material zone 17', 17". The material zone 16 marks that zone which, during the drawing of the blank, is clamped in between the clamping devices 30a-b (see FIG. 4). Hereinafter, wherever appropriate an unprimed reference numeral for the blanks or portions thereof will imply either the single-or double-primed equivalents. The material zone 15 marks that zone which, on drawing of the blank, is in contact with the press face 21 of the press tool 20 (see FIG. 4). The material zone 17 marks that zone which, on drawing of the blank, is brought into the state of flow.

Figure 3:
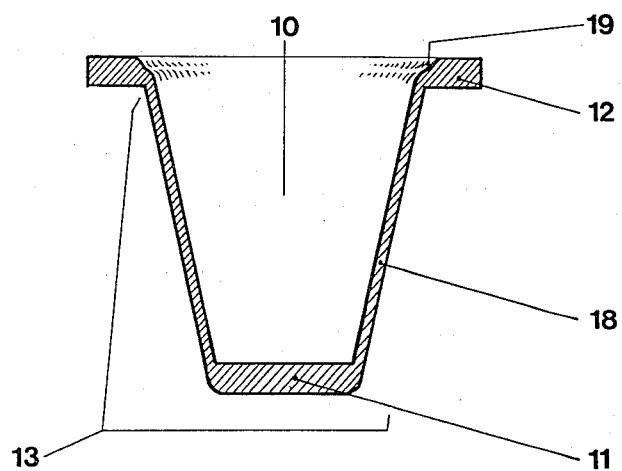
FIG. 3 shows an element having a bottom part of the body, consisting mainly of amorphous material.

An element 10 consisting of an edge part 12 and a body 13 is seen in FIG. 3. The body in turn consists of a wall part 18 and a bottom part 11. In the figure, the wall part consists of drawn material of reduced thickness compared with the thickness of the starting material. The bottom part 11 consists of material which, while retaining its material properties, has been displaced in the axial direction of the body. Moreover, a zone 19 is indicated in which material belonging to the edge part 12 had been transformed into the state of flow.

Figure 4:
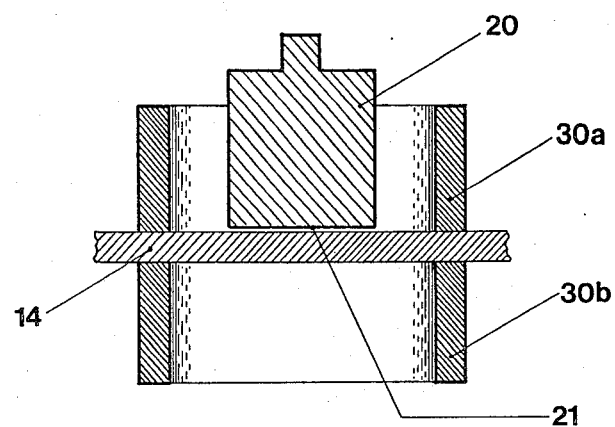
FIGS. 4 to 10 show the principles of devices for the drawing of the element.
Figure 5:
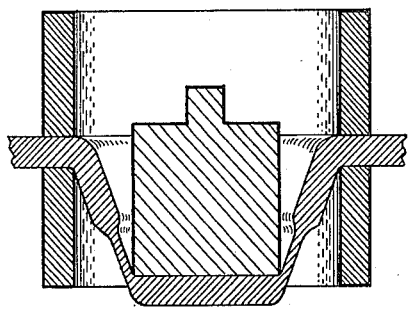
Figure 6:
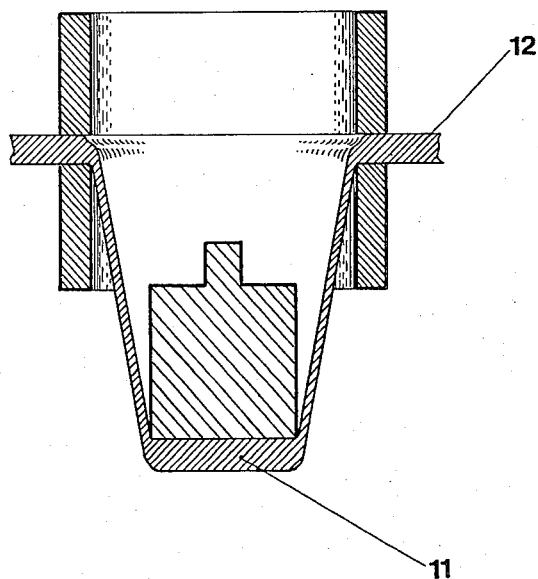
Figure 7:
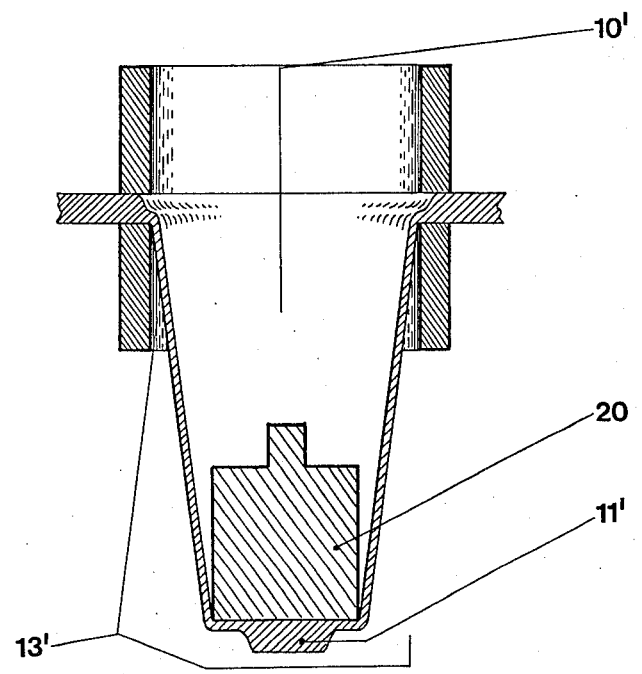
Figure 8:
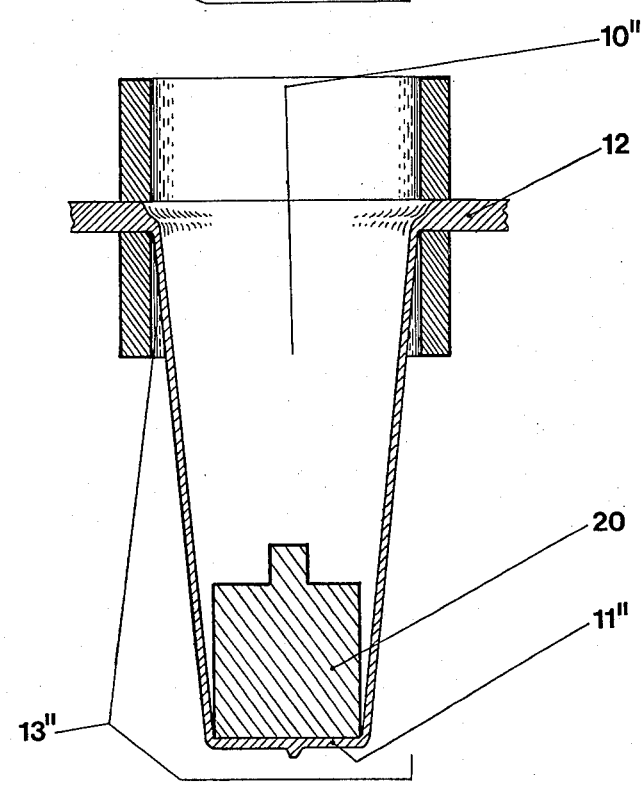

In FIGS. 4 to 8, a number of clamping devices 30 which secure the blank 14 can be seen. A press tool 20 with a press contact face 21 is located between the clamping devices 30. In FIG. 4, the press tool 20 is in a position in which the press contact face 21 is located directly on the upper surface of the blank 14. FIG. 5 shows the press tool after a downward shift, flow of the material having started. In FIG. 6, the press device has been shifted to such an extent that an element according to FIG. 3 has been formed. In FIG. 7, the press tool has been further shifted, further flow of the material having taken place. An element 10' has thus been formed, the body 13' of which has a bottom part 11', the central sections of which consist of amorphous undrawn material which is surrounded by drawn oriented material in which flow has taken place. Finally, in FIG. 8, the press tool 20 has been shifted to such an extent that virtually the entire material in the bottom part 11" of the body 13" has undergone flow. An element 10" has thus been formed in which both the wall part and the bottom part of the body have a reduced wall thickness because the material has been in the state of flow and has at the same time been oriented.

Figure 10:
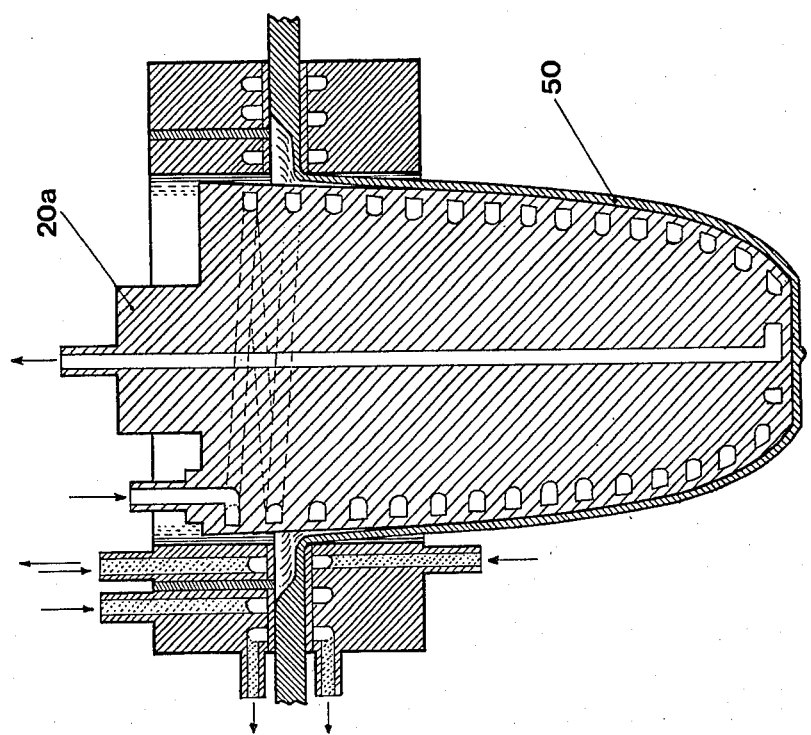
Figure 9:
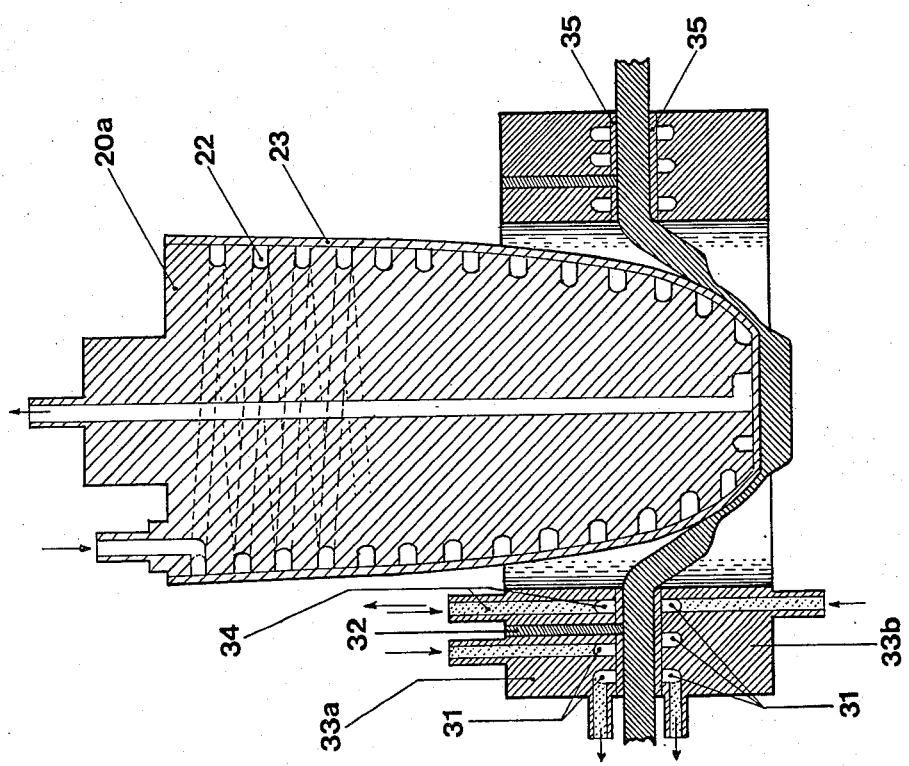

In FIGS. 9 and 10, an optional embodiment of the clamping devices 33a-b is represented, which are provided with cooling channels 31 and heating channels 34. In the figures, only the feedline for the heating channels is shown, whilst the discharge line for the heating channels is located behind the feedline in the figures and is indicated by the upward-pointing arrow. Both the cooling channels and the heating channels are covered by plate-like covers 35, the other surface of which at the same time represents the contact surface of the clamping devices for clamping the blank.

An insulation 32 separates the cooled zone of the clamping devices from the heated zone. In certain applications, the heating channels are also used as the cooling channels.

Furthermore, the figures show an optional embodiment of a press device 20a which is also provided with cooling channels 22. The cooling channels are covered by a cooling jacket 23 which at the same time represents the outer contact surface of the press device opposite the material during the process of drawing the latter. FIG. 9 shows a position of the press device, which corresponds to the position in FIG. 5, and FIG. 10 shows a position of the press device, which corresponds to the position in FIG. 8. The press device has a face with a rotationally symmetrical curvature, which is shaped in such a way that, on drawing within the flow range, the material is always in contact with the cooling jacket, whilst that material which has not yet been in the state of flow is completely without contact with any device in the zone between the press device and the clamping device.

Heating of the material with the aid of the heating channels 34 has the purpose of increasing the readiness of the material to flow. Heating is limited, however, inasmuch as the temperature of the material must always be lower than the glass transition temperature $T_g$. Heating makes it possible to allow the drawing step of the material to continue a little into the zone between the jaws of the clamping devices, as shown in FIG. 10. Another optional application, where the increased readiness of the material to flow is exploited, is obtained when, during the drawing step, the zone of initial flow of the material is directed to the zone next to the inner edges of the clamping devices. After flow has taken place, the flow zone is gradually displaced in the direction away from the clamping devices towards the bottom of the press device, as the press device gradually shifts downwards as in the figures. The result of this is that flow always propagates in the same direction, and a new start of flow is avoided, such as takes place when the embodiment of the invention shown in FIGS. 4 to 8 is used.

The above description of the element and a process as well as equipment for producing the element merely represents examples for the application of the invention. The invention allows of course that a number of successive drawing steps take place, zones of drawn and undrawn material forming alternately. For example, the body consists of band parts with sections which contain undrawn material, whilst the bottom part consists of sections, for example annular sections, which contain undrawn material and which are displaced in the axial direction of the body relative to the lower edge of the wall part.

The material oriented by flowing possesses improved strength properties in the direction of orienting, which largely corresponds to the direction in which the material is drawn. Heating of the material to a temperature which is above the glass transition temperature $T_g$ makes it easy, in a blow process, to shape the element by stretching the material in a direction largely at right angles to the said direction of orienting. An element shaped in this way represents, for example, a container having a middle shell surface of a diameter which exceeds the diameter of the opening, and having a bottom which consists of a standing surface which represents a transition between the lower edge of the shell surface and the bottom surface, the bottom surface optionally being slightly concave and optionally consisting of annular material zones which are displaced relative to one another in the axial direction of the container. The element is also suitable for shaping according to a process similar to deep-drawing, which is used in the manufacture of metal products.

The concept of the invention comprises many optional embodiments. According to one of these, drawing of the body of the element is effected by a number of successive drawing steps, the contact area of the press device decreasing for each drawing step. The result of this is that, in particular if the press device tapers in the direction of the contact surfaces, the width of the material zone 15 is adapted to the extent to which the drawing step has proceeded. While only a limited number of embodiments have been shown and described in detail there will now be obvious to those skilled in the art many modifications and variations satisfying many or all of the objects of the invention which do not depart from the spirit thereof as defined by the appended claims.

What is claimed is:

1. An element formed from a blank of amorphous PET having a crystallinity of less than 10%, said element comprising an annular edge part and a depressed portion extending from said edge part and surrounded by said edge part, said depressed portion being of cup-like shape, said edge part forming a rim for said depressed portion of cup-like shape, said edge part consisting of substantially undrawn, amorphous, PET having a crystallinity of less than 10%, said depressed portion including an annular wall portion of uniform thickness consisting of PET drawn at an initial temperature below Tg and having one-third the thickness of the amorphous blank and undergone material flow to provide crystallinity of between 10 and 25% with a monoaxial orientation, said annular wall portion having a smaller thickness than said annular edge part.

2. The element as claimed in claim 1 wherein said depressed portion further includes a central bottom part axially spaced from said edge part.

3. The element as claimed in claim 2 wherein said central bottom part consists of said thermoplastic material in substantially undrawn state and having a crystallinity of less than 10%.

4. The element as claimed in claim 3 wherein said central bottom part has a thickness substantially equal to that of said edge part.

5. The element as claimed in claim 2 wherein said central bottom part consists of said thermoplastic material in substantially drawn state which has undergone material flow and has a crystallinity of between 10 and 25%.

6. The elememt as claimed in claim 5 wherein said central bottom part is continuous with and of the same cyrstallinity and thickness as said annular wall portion.

7. The element as claimed in claim 1 wherein said thermoplastic material of said blank and said edge part has a crystallinity less than 5%.

8. The element as claimed in claim 1 wherein said thermoplastic material of said blank and said edge part is amorphous.

9. The element as claimed in claim 1 wherein said annular wall portion has a crystallinity of between 12% and 20%.

10. An article comprising a cup-like element of PET having a side wall including a crystallized portion which is monoaxially oriented as obtained by free drawing of a flat sheet of amorphous material until flow sets in along the wall and crystallinity achieves a value between 10 and 25%.

11. An article as claimed in claim 10 wherein said sheet is drawn at a temperature below Tg before drawing.

12. An article as claimed in claim 10 wherein the side wall has a thickness of about ⅓ of the thickness of the sheet of amorphous material which is drawn.

13. An article as claimed in claim 12 wherein said side wall is conical.

14. An article as claimed in claim 13 comprising a bottom of amorphous material.

15. An article as claimed in claim 13 comprising a bottom of crystallized material having a thickness equal to that of the side wall.

16. An article as claimed in claim 13 comprising a rim of amorphous material of the same thickness as said flat sheet.

* * * * *